United States Patent [19]

Licht et al.

[11] Patent Number: 5,204,178

[45] Date of Patent: Apr. 20, 1993

[54] (METH)ACRYLATE COPOLYMERS AND THEIR USE IN NONLINEAR OPTICS AND FOR THE PRODUCTION OF LANGMUIR-BLODGETT

[75] Inventors: Ulrike Licht, Mannheim; Harald Fuchs, Carlsberg; Dirk Funhoff; Wolfgang Schrepp, both of Heidelberg; Hans Schupp, Worms, all of Fed. Rep. of Germany

[73] Assignee: BASF Aktiengesellschaft, Ludwigshafen, Fed. Rep. of Germany

[21] Appl. No.: 784,427

[22] PCT Filed: May 30, 1990

[86] PCT No.: PCT/EP90/00866

§ 371 Date: Nov. 12, 1991

§ 102(e) Date: Nov. 12, 1991

[87] PCT Pub. No.: WO90/15087

PCT Pub. Date: Dec. 13, 1990

[30] Foreign Application Priority Data

Jun. 2, 1989 [DE] Fed. Rep. of Germany ....... 3918016

[51] Int. Cl.$^5$ ............................................. B32B 27/30
[52] U.S. Cl. .................... 428/333; 526/245; 526/263; 526/298; 526/304; 526/309; 526/311; 428/411.1; 428/64; 427/434.3
[58] Field of Search ............... 526/311, 245, 304, 298, 526/263; 428/333, 411.1, 64; 427/434.3

[56] References Cited

U.S. PATENT DOCUMENTS

| | | |
|---|---|---|
| 4,293,435 | 10/1981 | Portugall et al. . |
| 4,631,328 | 12/1986 | Ringsdorf et al. . |
| 4,661,576 | 4/1987 | Decobert et al. .................... 526/298 |
| 4,694,066 | 9/1987 | De Martino et al. ................ 528/373 |
| 4,755,574 | 7/1988 | Choe ..................... 526/258 |
| 4,762,912 | 8/1988 | Leslie et al. .......................... 528/503 |
| 4,779,961 | 10/1988 | De Martino .................... 350/350 R |
| 4,801,670 | 1/1989 | De Martino et al. ................ 526/263 |
| 4,822,865 | 4/1989 | De Martino et al. ............. 526/292.2 |
| 4,896,292 | 1/1990 | Eich et al. ............................ 365/108 |

FOREIGN PATENT DOCUMENTS

| | | |
|---|---|---|
| 228703 | 7/1987 | European Pat. Off. . |
| 258898 | 3/1988 | European Pat. Off. . |
| 271730 | 6/1988 | European Pat. Off. . |
| 0290061 | 11/1988 | European Pat. Off. . |
| 0300418 | 1/1989 | European Pat. Off. . |
| WO88/04305 | 11/1987 | PCT Int'l Appl. . |

OTHER PUBLICATIONS

Hawley's Condensed Chemical Dictionary, 11th Ed., Van Nostrad, New York, 1987, p. 35.
Optische Phasenkonjugation; Schkunow et al., Spektrum der Wissenschaft, Feb. 1986, 92-97 (German).
Dynamic holography and coherent four wave . . . , Hulgnard et al., SPIE vol. 215 Recent Advances in Holography (1980).
Nonlinear Optical Polymer Systems and Devices, Ulrich, Mol. Cryst. Liq. Cryst., 1988, vol. 160, pp. 1-31.
Some New Side-Chain Liquid Crystalline . . . , Barny et al., SPIE vol. 682 Mol. and Poly. Optoelectronic Materials; Fundamentals and Applications, 1986.
The Characterization of Langmuir-Blodgett . . . , Carpenter et al., Thin Solid Films, 161 1988, 315-324.

Primary Examiner—Joseph L. Schofer
Assistant Examiner—M. Nagumo
Attorney, Agent, or Firm—Keil & Weinkauf

[57] ABSTRACT

Novel (meth)acrylate copolymers which contain, as polymerized units,

A) one or more (meth)acrylates and/or (meth)acrylamides having second order nonlinear optical properties and of the general formula I

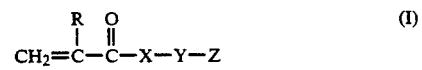

where R is hydrogen or methyl, X is a flexible spacer, which may or may not be present, Y is a divalent group having electron donor activity and Z is a noncentrosymmetric radical containing an easily polarizable conjugated $\pi$-electron system and one or more electron acceptor groups, and B) one or more (meth)acrylates of alkanols where the alkyl radical is of 10 to 30 carbon atoms in a molar ratio of (A) to (B) of from 1:0.5 to 1:5 are very suitable as nonlinear optical materials for nonlinear optical arrangements and for the production of Langmuir-Blodgett films. The novel (meth)acrylate copolymers which contain terminal nitro, trifluoromethyl, cyano or fulven-6-yl groups as electron acceptors and have molar ratios A to B differing from those mentioned above are also suitable for intended uses outside nonlinear optics.

8 Claims, No Drawings

(METH)ACRYLATE COPOLYMERS AND THEIR USE IN NONLINEAR OPTICS AND FOR THE PRODUCTION OF LANGMUIR-BLODGETT

The present invention relates to novel (meth)acrylate copolymers which have nonlinear optical properties and which can form solid monomolecular Langmuir-Blodgett films.

The present invention furthermore relates to the use of the novel (meth)acrylate copolymers in nonlinear optics and Langmuir-Blodgett films which are obtained using the novel (meth)acrylate copolymers.

The present invention also relates to a novel process for the uniform spatial orientation of organic radicals.

Nonlinear optics is concerned very generally with the interaction of electromagnetic fields in different substances and the associated field-dependent refractive index in these substances.

Very generally, a substance emits light if dipoles oscillate in it, the frequency of the emitted light wave being equal to the oscillation frequency of the dipoles. If the oscillating dipoles contain a plurality of frequency components, all of these occur in the light emitted by the relevant substance. If the dimensions of the substance are greater than the wavelength of the emitted light, the identical dipoles oscillating in the substance should as far as possible oscillate in the same direction and with a phase difference which ensures that the light emitted by a volume element is not extinguished by destructive interference with the light emitted by another volume element.

In a polarizable substance, macroscopic polarization P, which is defined as the dipole moment per unit volume, is inducted by an external electric field E.

If the polarizable substance does not contain any permanent molecular dipoles, the dipole moment and hence the macroscopic polarization $\vec{P}$ from a shift of the electrons by an amount $\vec{d}$ away from their rest position, i.e. from the center of the positive charge. On the other hand, if the polarizable substance contains permanent dipoles, the applied electric field $\vec{E}$ results in a change in the permanent dipole moment by the same mechanism.

As long as the shift $\vec{d}$ remains proportional to the electric field $\vec{E}$, the polarization P is also proportional to the electric field $\vec{E}$, which is expressed by the known linear equation 1

$$\vec{P} = \epsilon_0 \chi \vec{E} \qquad \text{Equation 1.}$$

In Equation 1, $\epsilon_0$ is the absolute dielectric constant and $\chi$ is the dielectric susceptibility.

If the external electric field $\vec{E}$ is increased, every substance must of course exhibit a deviation from the linear law according to Equation 1 above a field strength specific to it. The mechanical analog to this is the deviation from Hook's law when a spring is overloaded. Such deviations from linearity are most simply handled mathematically by adding a parabolic term and higher powers of the variables, i.e. the nonlinear function is expanded by powers of the variable $\vec{E}$ resulting in Equation 2

$$\vec{P} = \epsilon_0 (\chi^{(1)}\vec{E} + \chi^{(2)}\vec{E}\vec{E} + \chi^{(3)}\vec{E}\vec{E}\vec{E} \ldots) \qquad \text{Equation 2}$$

the fundamental equation of nonlinear optics. In this equation, $\chi^{(1)}$ is the first order dielectric susceptibility, which is finally responsible for linear optical behavior of the relevant substance, $\chi^{(2)}$ is the second order dielectric susceptibility, which induces second order nonlinear optical behavior in the relevant substance, and $\chi^{(3)}$ is the third order dielectric susceptibility, which is responsible for the third order nonlinear optical behavior of the relevant substance.

Both $\chi^{(2)}$ and $\chi^{(3)}$ are material constants which are dependent on the molecular structure, the crystal structure, the frequency of light and in general also the temperature. It is known that they can be determined by the dynamic holographic method of "four wave mixing", as described by W. W. Schkunow et al. in Spektrum der Wissenschaft, February 1986, pages 92 to 97, and J. P. Huignard et al. in SPIE Volume 215, Recent Advances in Holography, pages 178 to 182, 1980.

Substances having a dielectric susceptibility $\chi^{(2)}$ dependent on the field strength, i.e. having nonlinear second order optical properties, give rise to a number of dispersive processes, such as frequency doubling (second harmonic generation, SHG), which permits the production of light having half the wavelength of the incident light, the electrooptical effect (Pockels' effect), which permits a change in the refractive index when an electric field is applied, or sum and difference frequency mixing, and frequency mixing which permits the continuous adjustment of laser light, resulting in many technical applications. Examples are the electrooptical switches, frequency and intensity control in laser technology, and holography, information processing and integrated optics.

Substances having a dielectric susceptibility $\chi^{(3)}$ which is dependent on the field strength, i.e. having nonlinear third order optical properties, are suitable, inter alia, for the production of purely optical switches and hence as waveguides for the construction of purely optical computers.

Other possible applications are described in the publication by D. R. Ulrich, Nonlinear Optical Polymer Systems and Devices, in Molecular Crystals and Liquid Crystals, Volume 180, pages 1 to 31, 1988. This article also describes the growing importance of polymers having nonlinear optical properties, which it is hoped will be distinguished by response times of less than one picosecond, high, nonresonant nonlinearity, low dielectric constant for direct current, low switching energies, a broad frequency range, low absorbance, the absence of diffusion problems, the possibility of resonance amplification, simple production and processibility and the possibility of modification in a simple manner, good handling properties and the possibility of use at room temperature, stability to environmental influences and mechanical and structural stability, and will therefore increasingly replace the long-known organic and inorganic crystalline substances having nonlinear optical properties.

It is known that these polymers, like all substances, have the third order nonlinear optical properties, whereas the second order nonlinear optical properties are associated with the presence of a noncentrosymmetric molecular structure and/or a noncentrosymmetric molecular arrangement in the crystals. Furthermore, a polymer must have a dielectric susceptibility $\chi^{(2)}$ of not less than $10^{-8}$, preferably $10^{-7}$, esu in order to be suitable for the abovementioned intended uses, which sets high requirements for the molecular structure of the polymers as such, their production and the uniform spatial orientability of the groups present therein and having second order nonlinear optical properties. Only if these requirements are met can the other advantages which are peculiar to the polymers or which it is hoped they will have be beneficially used or realized.

(Meth)acrylate or (meth)acrylamide polymers or copolymers which contain, as polymerized units, one or more (meth)acrylates and/or (meth)acrylamides having second order nonlinear optical properties and of the general formula I

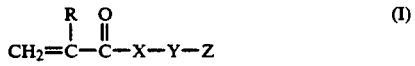

where R is hydrogen or methyl, X is a flexible spacer, which may or may not be present, Y is a divalent group having electron donor activity and Z is a noncentrosymmetric radical containing an easily polarizable conjugated $\pi$-electron system and one or more terminal electron acceptor groups, are disclosed in U.S. Pat. No. 4,755,574, U.S. Pat. No. 4,762,912, EP-A-0 271 730, WO 88/04305 and publication by P. LeBarny et al., Some new side-chain liquid crystalline polymers for nonlinear optics, in SPIE, Volume 682, Molecular and Optoelectronic Materials: Fundamentals and Applications, pages 56 to 64, 1986. The uniform spatial orientation of the side groups, which is necessary for utilizing their second order nonlinear optical properties, is achieved in these (meth)acrylate and (meth)acrylamide polymers and copolymers through melting and glassy solidification of the polymers, in which the side groups, owing to their liquid crystalline properties, are spatially uniformly oriented, or through (co)polymerization of uniformly spatially oriented (co)monomer films.

Furthermore, EP-A-0 271 730 discloses that the (meth)acrylates described therein and of the general formula I can be copolymerized with vinyl monomers, such as an alkyl (meth)acrylate. However, specific alkyl (meth)acrylates are not mentioned, nor are the amounts in which they are to be used stated.

WO 88/04305 discloses that the (meth)acrylates or (meth)acrylamides described therein and of the general formula I can be copolymerized with one or more (meth)acrylates of an alkanol where the alkyl radical is of 1 to 20, preferably from 4 to 8, carbon atoms. However, ratios are not stated, and the examples describe only copolymers of 4-{2-[4-(6-methacryloyloxyhexyloxy)-phenyl]-ethenyl}-pyridine or 4-[4-(6-methacryloyloxyhexyloxy)-phenyl]-pyridine with 2-[4-(4'-cyanobiphenyl-4-yloxycarbonyl)-phenoxy]-ethyl methacrylate. Furthermore, the radicals Z of the (meth)acrylates or (meth)acrylamides of the general formula I of WO 88/04305 contain no terminal nitro, trifluoromethyl, cyano or fulven-6-yl groups as electron acceptors.

Solid monomolecular films are likewise known. They are formed by compounds which have a polar and therefore hydrophilic molecular end and a nonpolar and therefore hydrophobic long-chain radical. Compounds of this type are generally also referred to as amphiphiles. For film formation, the amphiphiles are applied to a water surface, over which they spread, their polar end dipping into the aqueous phase and their hydrophobic long-chain radicals projecting out of the aqueous phase. If the compounds are then pushed together on the water surface by means of a barrier, above a certain surface pressure they arrange themselves into a solid monomolecular film in which the hydrophobic long-chain radicals are uniformly spatially oriented. The transformation into such a solid monomolecular film is evident, in the form of a sharp pressure increase, in the pressure/area graph recorded during pushing together of the relevant compound. This pressure increase is a result of the increased resistance of the now solid monomolecular film to further compression by the barrier.

The solid monomolecular film produced in this manner can be drawn onto the surface of substrates in a simple manner. This is effected, for example, by immersing the substrate in the aqueous phase and withdrawing it again, with the result that the solid monomolecular film is transferred from the water surface to the substrate surface; for example, from hydrophobic surfaces, such as pure silicon surfaces, the nonpolar molecular ends of the compounds adhere to the substrate surface. Complete transfer is generally referred to in terms of a transfer ratio of 1.

One or more further layers of this type can be drawn onto the surface of the solid monomolecular film present on the substrate. Usually, this further solid monomolecular film is applied to the first film in such a way that the polar molecular ends of the compounds of both films face one another This spatial arrangement is also referred to as head-head-tail-tail orientation or as Y deposition. If a third film is applied to this double film, it is arranged in a corresponding manner, so that its hydrophobic long-chain radicals face the relevant radicals of the second film, whereas their polar molecular ends point outward.

If the compounds which form these solid monomolecular multilayers have a permanent dipole moment, the Y deposition results in macroscopic polarization P, which is due only to the uppermost of the films, only in the case of an odd number of films one on top of the other. For an even number, of course, a macroscopic polarization P of zero results because the dipole moments of the individual films cancel one another owing to their opposite orientation.

If, on the other hand, in the case of a solid monomolecular multilayer applied in Y deposition, it is intended to achieve, at least approximately, the maximum possible macroscopic polarization P, solid monomolecular films of compounds without a dipole moment must be intercalated in Y deposition between the individual films of compounds having a permanent dipole, resulting in an alternating film sequence in which all permanent dipoles present are uniformly oriented.

It is known that both the solid monomolecular monolayers and the corresponding multilayers are referred to as Langmuir-Blodgett films. The process for their production and the apparatuses used for this purpose are usually summarized by the standard technical term Langmuir-Blodgett technology. For the sake of brevity, only these technical terms will be used below.

Langmuir-Blodgett films which are formed by (meth)acrylate copolymers which have side groups which possess liquid-crystalline, nonlinear optical properties are disclosed in the publication by M. M. Carpenter et al., The Characterization of Langmuir-Blodgett Films of a Non-Linear Optical, Side Chain Liquid Crystalline Polymer, in Thin Solid Films 161 (1988), 315-324. However, these are not copolymers of a (meth)acrylate of the general formula I with alkyl (meth)acrylates but are the copolymer shown below:

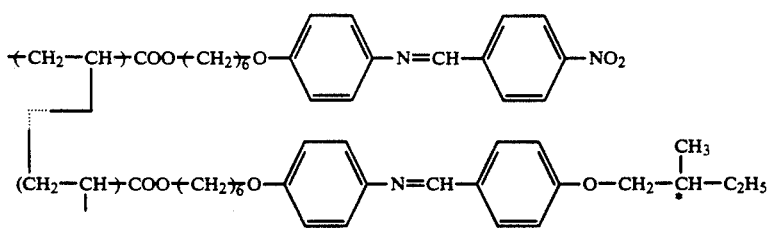

Although the side groups of this copolymer can be uniformly spatially oriented by means of Langmuir-Blodgett technology, the polymer is not obtainable in a simple manner.

The (meth)acrylate copolymers and Langmuir-Blodgett films known to date do not yet meet all the requirements set in practice for the production and the uniform spatial orientability of polymers having second order nonlinear optical properties. With the (meth)acrylate copolymers known to date, it is therefore not possible to realize the abovementioned advantages expected of polymers having nonlinear optical properties to the extent and with the reliability absolutely essential for technical use.

It is an object of the present invention to provide novel (meth)acrylate copolymers which do not have the disadvantages of the prior art and whose side groups having second order nonlinear optical properties can be uniformly spatially oriented in a simple and reliable manner, so that the novel (meth)acrylate copolymers can be used as nonlinear optical materials in nonlinear optical arrangements.

We have found that this object is essentially achieved, surprisingly, if (meth)acrylates and/or (meth)acrylamides of the abovementioned general formula I are copolymerized in certain defined molar ratios with one or more (meth)acrylates of alkanols where the alkyl radical is of 10 to 30 carbon atoms, and the resulting copolymers are then formed into Langmuir-Blodgett films by means of Langmuir-Blodgett technology.

The present invention accordingly relates to (meth)acrylate copolymers which contain, as polymerized units, (A) one or more (meth)acrylates and/or (meth)acrylamides having second order nonlinear optical properties and of the general formula I

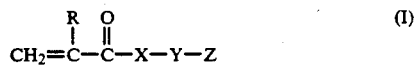

where R is hydrogen or methyl, X is a flexible spacer, which may or may not be present, Y is a divalent group having electron donor activity and Z is a noncentrosymmetric radical containing an easily polarizable conjugated $\pi$-electron system and one or more terminal electron acceptor groups, and B) one or more (meth)acrylates of alkanols where the alkyl radical is of 10 to 30 carbon atoms, in a molar ratio of (A) to (B) of from 1:0.5 to 1:5.

In view of the prior art cited at the outset, it was not to be expected that the novel (meth)acrylate copolymers, which can be simply prepared and furthermore have the high second order dielectric susceptibility $\chi^{(2)}$ of from $>10^{-8}$ to $10^{-7}$ esu, which is required for use, can also be uniformly spatially oriented in a particularly simple manner without having to rely for this purpose on side groups which have liquid crystalline properties and are difficult to prepare or on methods for forced uniform spatial orientation.

The novel (meth)acrylate copolymers contain the (meth)acrylates and/or (meth)acrylamides (A) having second order nonlinear optical properties and of the general formula I and the (meth)acrylates (B) in a molar ratio of (A) to (B) of 1:0.5 to 1:5, as polymerized repeating units.

It is possible to use molar ratios (A):(B) greater than 1:0.5, for example from 1:0.4 to 1 0.1, but the side radicals or side groups —CO—X—Y—Z or —CO—Y—Z of the (meth)acrylates or of the (meth)acrylamides (A) of the general formula I then sometimes can no longer be reliably uniformly spatially oriented.

If, on the other hand, molar ratios (A):(B) of less than 1:5, for example from 1:6 to 1:20, are chosen, the nonlinear optical properties of the relevant (meth)acrylate copolymers sometimes cannot fully meet all requirements in practice.

Accordingly, the molar ratio (A):(B) of from 1:0.5 to 1:5 to be used according to the invention is an optimum range within which the molar ratios can be freely selected and adapted in an outstanding manner to the particular (meth)acrylates and/or (meth)acrylamides (A) used and to the (meth)acrylates (B) and to the particular intended use.

Within this optimum range, the molar ratios (A):(B) of from 1 0.9 to 1 4 are particularly noteworthy because such molar ratios result in novel (meth)acrylate copolymers which, on the one hand, have second order nonlinear optical properties which are suitable in practice and, on the other hand, can be particularly excellently formed, by means of Langmuir-Blodgett technology, into Langmuir-Blodgett films in which all side groups —CO—X—Y—Z or CO—Y—Z of the general formula I are uniformly spatially oriented, which is essential especially with regard to the use of the relevant novel (meth)acrylate copolymers as nonlinear optical materials.

The novel (meth)acrylate copolymers can contain, as polymerized units, only the (meth)acrylates and/or the (meth)acrylamides (A) of the general formula I and the (meth)acrylates (B). For specific intended uses, however, they may contain further (meth)acrylate, (meth)acrylamide, vinylaromatic, vinyl halide, vinyl ester, vinyl ether, allyl ester, allyl ether, alkene or alkadiene comonomers or acrylonitrile as polymerized units. These comonomers may carry dichroic chromophores or mesogenic groups, i.e. groups having liquid-crystalline properties. In this context, reference may be made to the prior art cited at the outset or to EP-A-0 184 482, EP-A-0 228 703, EP-A-0 258 898, DE-A-36 03 267 or DE-A36 31 841, which disclose further such comonomers. If such further comonomers are contained as polymerized units in the novel (meth)acrylate copolymers, they are present in molar ratios which do not reduce the particular advantages of the novel (meth)acrylate copolymers.

Regardless of whether the novel (meth)acrylate copolymers contain further comonomers as polymerized units, the molar ratio (A):(B) is within the above-mentioned limits.

The novel (meth)acrylate copolymers which contain, as polymerized units, only one or more (meth)acrylates or (meth)acrylamides (A) having second order nonlinear optical properties and of the general formula I and one or more (meth)acrylates (B) are preferred according to the invention.

Examples of suitable flexible spacers X which may be used for the (meth)acrylates and/or (meth)acrylamides (A) of the general formula I which are to be employed according to the invention and have second order nonlinear optical properties are substituted or unsubstituted 1-oxaalkanediyl groups whose carbon chains may be interrupted by hetero atoms, such as oxygen, nitrogen, phosphorus or sulfur. The 1-oxaalkanediyl groups advantageously contain 2 to 12, in particular 2 to 6, carbon atoms. Examples of particularly suitable spacers X are 1-oxapropane-1,3-diyl, 1-oxabutane-1,4-diyl, 1-oxapentane-1,5-diyl, 1-oxahexane-1,6-diyl and 1-oxaheptane-1,7-diyl, of which 1-oxapropane-1,3-diyl and 1-oxaheptane-1,7-diyl are particularly preferred. Frequently, the 1-oxadodecane1,12-diyl group also proves very particularly advantageous.

Examples of suitable divalent groups Y having electron donor activity for the (meth)acrylates and/or (meth)acrylamides (A) of the general formula I which are to be employed according to the invention and have second order nonlinear optical properties are ether, thioether, amino or N-alkylamino groups, —N—(alkyl)— or the groups

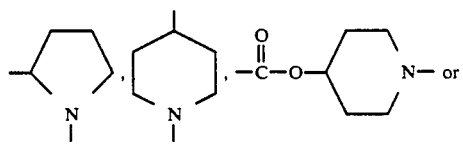

of which the ether, amino and N-alkylamino groups, —N—(alkyl)—, in particular N-methylamino, and piperazine-1,4-diyl are particularly preferred.

Examples of suitable noncentrosymmetric radicals Z, containing an easily polarizable conjugated π-electron system and one or more terminal electron acceptor groups, for the (meth)acrylates and (meth)acrylamides (A) of the general formula I which are to be employed according to the invention and have second order nonlinear optical properties are

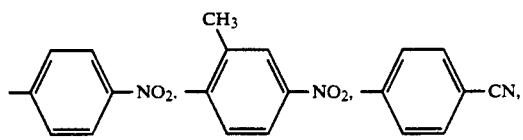

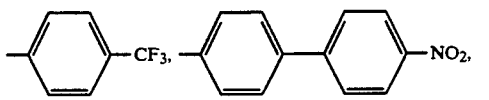

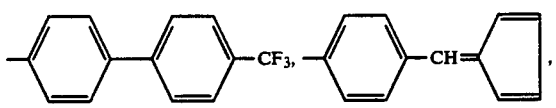

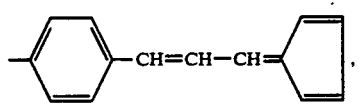

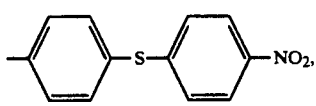

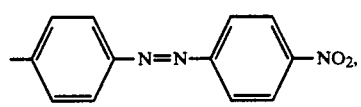

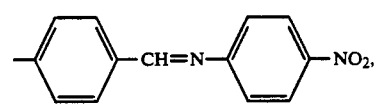

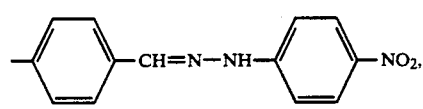

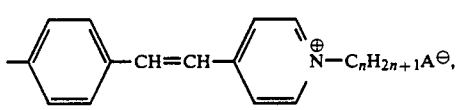

where n is an integer of from 1 to 22, $A^\ominus$ is a conventional acid anion, such as $Cl^\ominus$, $Br^\ominus$ or $HSO_4^\ominus$,

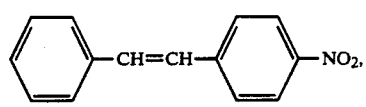

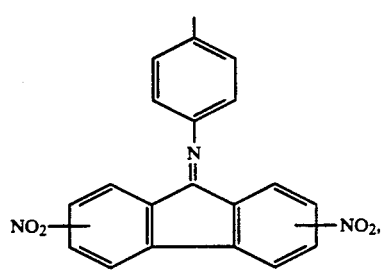

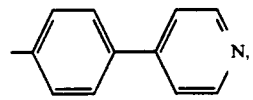

-continued

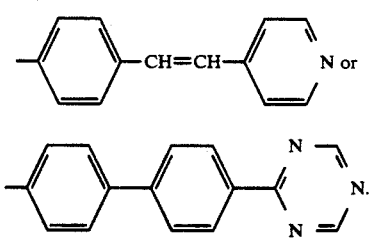

Examples of suitable radicals Z are those which contain nitro, cyano, trifluoromethyl or fulven-6-yl as the terminal electron acceptor group, since the novel (meth)acrylate copolymers which contain, as polymerized units, one or more (meth)acrylates and/or (meth)acrylamides (A) of the general formula I having one of these suitable radicals Z and one or more (meth)acrylates (B) have, in the case of molar ratios (A):(B) greater than 1:0.5 and less than 1:5, properties which make the relevant (meth)acrylate copolymers also suitable for intended uses outside nonlinear optics, in the field of molding production.

Examples of suitable radicals -X-Y-Z or -Y-Z for the (meth)acrylates and/or (meth)acrylamides (A) of the general formula I which are to be employed according to the invention and have second order nonlinear optical properties, which radicals consist of the abovementioned examples of flexible spacers X, divalent groups Y having electron donor activity and radicals Z or only of the abovementioned examples of Y and Z, are disclosed in U.S. Pat. No. 4,694,066 (EP-A-0 235 506), U.S. Pat. No. 4,762,912, U.S. Pat. No. 4,755,574, WO 88/04305, EP-A-0 271 730 or the publications by M. M. Carpenter et al., in Thin Solid Films 161 (1988), 315–324, and P. LeBarny et al. in SPIE, Volume 682, Molecular and Polymeric Optoelectronic Materials: Fundamentals and Applications, pages 56 to 64, 1986.

Examples of suitable (meth)acrylates and (meth)acrylamides (A), having second order nonlinear properties and of the general formula I, for the preparation of the novel (meth)acrylate copolymers and of their preparation are disclosed in the two abovementioned publications by M. M. Carpenter et al. on the one hand and P. LeBarny on the other hand and in EP-A-0 271 730, WO 88/04305, U.S. Pat. No. 4,762,912 or U.S. Pat. No. 4,755,574.

Examples of particularly suitable (meth)acrylates and (meth)acrylamides (A), having second order nonlinear optical properties and of the general formula I, which are particularly advantageously used for the preparation of the novel (meth)acrylate copolymers are 2-[N-(p-nitrophenyl)-N-methylamino]-ethyl methacrylate and the corresponding acrylate, 4-(p-nitrophenylazo)-methacrylanilide and the corresponding acrylanilide, 11-[4-(p-nitrophenyl)-piperazin-1-yl]-undecyl methacrylate and the corresponding acrylate, 4-nitro-4'-[N-methyl-N-(11-methacryloyloxyundec-1-yl)-amino]-azobenzene and the corresponding acrylate and 4,-[N-methyl-N-(11-methacryloyloxyundec-1-yl)-amino]-benzaldehyde-4-nitrophenylhydrazone and the corresponding acrylate, of which the methacrylic derivatives are preferred.

Examples of suitable (meth)acrylates (B) of alkanols where the alkyl radical is of 10 to 30 carbon atoms are n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl, n-$C_{21}H_{43}$, n-$C_{22}H_{45}$, n-$C_{23}H_{47}$, n-$C_{24}H_{49}$, n-$C_{25}H_{51}$, n-$C_{26}H_{53}$, n-$C_{27}H_{55}$, n-$C_{28}H_{57}$, n-$C_{29}H_{59}$ or n-$C_{30}H_{61}$ acrylate or methacrylate. Among these, the (meth)acrylates (B) whose alkyl ester radicals (—COO—alkyl) have roughly the same or the same length as the radicals —CO—X—Y—Z or —CO—Y—Z of the (meth)acrylates and (meth)acrylamides (A) of the general formula I are suitable, the methacrylates (B) being particularly suitable and n-heptadecyl, n-octadecyl and n-nonadecyl methacrylate being very particularly suitable. Among the last-mentioned ones, n-octadecyl methacrylate is preferably used.

The novel (meth)acrylate copolymers have a number average molecular weight $\overline{M}_n$ of from 1,000 to 50,000, preferably from 2,000 to 20,000, in particular from 3,000 to 10,000. Their second order dielectric susceptibility determined by four wave mixing is greater than $\chi^{(2)} = 10^{-8}$, in particular $10^{-7}$ esu. A very particular advantage of the novel (meth)acrylate copolymers is that the second order dielectric susceptibility $\chi^{(2)}$ can be established and further increased in a simple manner by the uniform spatial orientation of their side groups in Langmuir-Blodgett monolayers and multilayers.

The preparation of the novel (meth)acrylate copolymers has no special features in terms of the method but is carried out by the conventional and known methods of free radical polymerization and copolymerization, as described in, for example, U.S. Pat. No. 4,762,912, U.S. Pat. No. 4,755,574, EP-A-0 271 730, WO 88/04305 or the abovementioned publications by M. M. Carpenter et al. and P. LeBarny et al.

The novel (meth)acrylate copolymers are very useful for production of nonlinear optical materials which either consist of the novel (meth)acrylate copolymers or which contain further components over and above these.

In particular, the novel (meth)acrylate copolymers are suitable for the production of Langmuir-Blodgett mono- and multilayers which either consist only of the novel (meth)acrylate copolymers or which, in the case of the multilayers, contain further different Langmuir-Blodgett films applied in Y deposition, in alternating sequence.

Particularly preferred Langmuir-Blodgett multilayers are those which contain Langmuir-Blodgett monolayers of one or more of the novel (meth)acrylate copolymers and Langmuir-Blodgett monolayers of one or more polymeric amphiphiles, applied in Y deposition and in alternating sequence.

An example of a particularly suitable polymeric amphiphile is

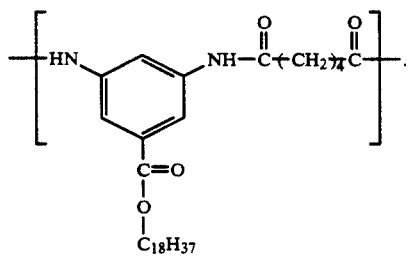

The production of these novel Langmuir-Blodgett mono- and multilayers has no special features in terms of the method but is carried out by the conventional and known Langmuir-Blodgett technology described at the outset.

The organic radicals or side groups in the novel (meth)acrylate copolymers prove to be particularly easy to orient uniformly spatially without having to rely on side groups which have liquid crystalline properties and are difficult to prepare or on methods for their forced uniform spatial orientation. In view of the use of the novel (meth)acrylate copolymers and of the novel Langmuir-Blodgett films as nonlinear optical materials, this is a very particular advantage.

If it is necessary during or after the uniform spatial orientation of the organic radicals in the novel (meth)acrylate copolymers by the Langmuir-Blodgett technology, the novel Langmuir-Blodgett mono- and multilayers can be produced with the aid of electric and/or magnetic fields of suitable direction and suitable sign and/or, after their production, can be subjected, if necessary in these fields, to conventional and known processes for domain growth, for example recrystallization or zone melting.

Accordingly, the novel (meth)acrylate copolymers are very useful for the production of novel nonlinear optical arrangements as used, for example, for frequency doubling, frequency mixing or optical waveguides or as present in optical modulators, optical multiplexers, optical logic modules or optical amplifiers.

These novel nonlinear optical arrangements contain one or more substrates adapted to the corresponding intended use in form and function, for example a semiconductor chip, and one or more films, in particular a Langmuir-Blodgett film, which contains or consists of one or more novel (meth)acrylate copolymers.

When they are used in nonlinear optical arrangements, further particular advantages of the novel (meth)acrylate copolymers and of the novel Langmuir-Blodgett films become evident: for example, their exact twodimensional orientation results in uniform thickness and the maximum possible anisotropy of the relevant films. Moreover, said films are stable to intense laser radiation.

EXAMPLES

EXAMPLE 1

Preparation of a novel methacrylate copolymer using a methacrylamide (A) having a radical —CO—Y—Z of the general formula I and n-octadecyl methacrylate (B)

Experimental method:

1. Preparation of 4-(p-nitrophenylazo)-methacrylanilide [(meth)acrylamide (A)]

4 g of 4-amino-4'-nitroazobenzene in 150 ml of chloroform were added dropwise to 1.71 g of methacryloyl chloride and 1.65 g of triethylamine in 20 ml of chloroform while cooling with ice water. After the addition, the resulting reaction mixture was first stirred for 2 hours at room temperature and then refluxed for 3 hours. Thereafter, a further 0.85 g of methacryloyl chloride and 0.82 g of triethylamine in 10 ml of chloroform were added, after which the reaction mixture was refluxed for 8 hours. After the mixture had cooled to room temperature, excess methacryloyl chloride was distilled off. The product solution was diluted with 30 ml of chloroform, after which 100 1 (sic) of water were added and washing was then carried out with a further two portions of 100 ml of water. The aqueous phases were separated off and the product solution was then dried with $Na_2SO_4$. Thereafter, 4-(p-nitrophenylazo)-methacrylanilide was isolated by evaporating the chloroform and was then purified by column chromatography over silica gel 60 using ethyl acetate/hexane in a volume ratio of 3:7 as the mobile phase. 0.95 g of the product which had the following physical properties was obtained: melting point: 210° C.; IR spectrum (KBr pellet): bands at 3,400, 2,900, 2,850, 1,690, 1,680, 1,590, 1,510, 1,340, 1,140, 1,110 and 840 cm$^{-1}$; $^1$H nuclear magnetic resonance spectrum (400 MHz, CDCl$_3$, tetramethylsilane as internal standard), chemical shift δ (in ppm): 8.37 (doublet, 2H), 8.0 (multiplet, 4H), 7.8 (doublet, 2H), 7.73 (singlet, 1H), 5.86 (singlet, 1H), 5.55 (singlet, 1H), 2.12 (singlet, 3H).

2. Preparation of the novel methacrylate copolymer 0.013 g of azobisisobutyronitrile was added to 0.87 g of n-octadecyl methacrylate and 0.4 g of 4-(p-nitrophenylazo)-methacrylanilide, after which the resulting reaction solution was flushed for 1 hour with nitrogen. Thereafter, the reaction solution was kept at 70° C. for 5 days, a further 0.013 g of azobisisobutyronitrile being metered in every 24 hours. The reaction solution was then evaporated down and the methacrylate copolymer was precipitated in methanol, purified by repeated reprecipitation from toluene with methanol and then dried. 0.3 g of the novel methacrylate copolymer, having a number average molecular weight $\overline{M}_n$ of 5,500 and a molar ratio (A):(B) of 1:3.9 determined by elemental analysis, was obtained The product, in the form of a film, had the following bands in its IR spectrum: 2,900, 2,850, 1,720, 1,690, 1,590, 1,510, 1,450, 1,340, 1,240, 1,170 and 1,140 cm$^{-1}$.

The novel methacrylate copolymer was very suitable for the production of nonlinear optical materials and of Langmuir-Blodgett films.

EXAMPLE 2

Preparation of a novel methacrylate copolymer using a methacrylate (A) having a radical —CO—X—Y—Z according to the general formula I and n-octadecyl methacrylate (B)

Experimental method:

1. Preparation of 2-[N-(p-nitrophenyl)-N-methylamino]-ethanol 5.25 g of N-methylethanolamine, 11.2 g of p-nitrofluorobenzene, 9.7 g of $K_2CO_3$ and 2 drops of tricaprylmethylammonium chloride in 70 ml of dimethylformamide were heated at 95° C. for 3 days. The resulting reaction mixture was poured onto 350 ml of water. The precipitated product was filtered off under suction, after which the aqueous phase was extracted with toluene. After drying and evaporating down the toluene solution, the two product fractions were combined and recrystallized from ethanol/water in a volume ratio of 2 1. 10.22 g of 2-[N-(p-nitrophenyl)-N-methylamino]-ethanol having the following physical properties were obtained: melting point: 99°-101° C., IR spectrum (KBr pellet): bands at 3,450, 2,900, 2,850, 1,690, 1,680, 2,900, 1,580, 1,470, 1,450, 1,330, 1,320, 1,110, 1,060 and 825 cm$^{-1}$; $^1$H nuclear magnetic resonance spectrum (400 MHz, CDCl$_3$, tetramethylsilane as internal standard, chemical shift δ (in ppm): 8.05 (doublet, 2H), 6.64 (doublet, 2H), 3.9 (triplet, 2H), 3.65 (triplet, 2H), 3.15 (singlet, 3H) 2.02 (singlet, 1H).

2. Preparation of 2-[N-(p-nitrophenyl)-N-methylamino]-ethyl methacrylate {(meth)acrylate (A)}

2.67 g of methacryloyl chloride in 5 ml of chloroform were added dropwise to 5 g of 2-[N-(p-nitrophenyl)-N-methylamino]-ethanol and 2.02 g of pyridine in 40 ml of chloroform while cooling. Thereafter, the resulting reaction solution was first stirred at room temperature and then refluxed for 3.5 hours. It was cooled to room temperature and then 40 ml of water were added to it, after which the chloroform phase was separated off and the aqueous phase was extracted with three times 20 ml of chloroform. After the combined chloroform phases had been dried with $Na_2SO_4$ and the chloroform evaporated off, the resulting product was washed with hexane and dried under reduced pressure. 2.6 g of 2-[N-(p-nitrophenyl)-N-methylamino]-ethyl methacrylate were obtained, the IR spectrum of the product in the form of a KBr pellet having bands at 2,950, 2,900, 1,720, 1,600, 1,510, 1,490, 1,320, 1,310, 1,160, 1,110 and 825 $cm^{-1}$.

3. Preparation of the novel methacrylate copolymer 0.93 g of 2-[N-(p-nitrophenyl)-N-methylamino]-ethyl methacrylate, 1.19 g of n-octadecyl methacrylate and 0.022 g of azobisisobutyronitrile were dissolved in 30 ml of toluene. The reaction solution was degassed by passing in nitrogen for one hour and then kept at 70° C. for 3 days in the absence of air, a further two portions of 0.021 g of azobisisobutyronitrile being metered in. The reaction solution was then evaporated down, after which the methacrylate copolymer was precipitated by adding methanol. After repeated reprecipitation from toluene by methanol, 0.93 g of the novel methacrylate copolymer having a number average molecular weight $\overline{M}_n$ of 6,100 and a molar ratio (A):(B) of 1:1.3, determined by elemental analysis, was obtained. The product had the following physical properties: IR spectrum (KBr pellet): bands at 2,900, 2,860, 1,720, 1,595, 1,510, 1,490, 1,320, 1,160 and 1,110 $cm^{-1}$; $^1H$ nuclear magnetic resonance spectrum (400 MHz, $CDCl_3$, tetramethylsilane as internal standard), chemical shift $\delta$ (in ppm): 8.13 (doublet), 6.75 (doublet), 3.93 (multiplet, unresolved), 3.75 (multiplet, unresolved), 3.1 (singlet), 1.6 (multiplet, unresolved), 1.22 (multiplet, unresolved), 0.88 ppm (triplet).

The novel methacrylate copolymer was easy to process, transparent, homogeneous and laser-stable in the form of a thin film and very suitable for the production of Langmuir-Blodgett films.

EXAMPLE 3

Preparation of a novel methacrylate copolymer using a methacrylate (A) having a radical —CO—X—Y—Z according to the general formula I and n-octadecyl methacrylate (B)

Experimental method:

1. Preparation of N-(11-hydroxyundecyl)-N'-(4-nitrophenyl)-piperazine 10 g of 11-bromoundecan-1-ol, 4 g of dry potassium carbonate powder, 8.27 g of 4-nitrophenylpiperazine and 2 drops of the conventional and known phase transfer catalyst Aliquat® 336 in 50 ml of dimethylpropyleneurea were heated at 85° C. for 6 hours and then left to stand for 2 days. The reaction mixture was then poured into 500 ml of water. The precipitated crude product was filtered off under suction (first fraction). The water phase was extracted a further three times with 50 ml of toluene in each case and four times with 50 ml of ethyl acetate in each case. The combined extracts were evaporated down and the remaining crude product fraction (second fraction) was combined with the first fraction, after which the combined crude product fractions were recrystallized from a mixture of ethanol and water in a volume ratio of 2:1. The recrystallized product was dried under reduced pressure, after which 7.8 g of N-(11-hydroxyundecyl)-N'-(4-nitrophenyl)-piperazine resulted. The product had the following physical properties: melting point 118° C., IR spectrum (KBr pellet): bands at 3,550, 2,900, 2,850, 1,595, 1,575, 1,470, 1,333, 1,255, 1,250, 1,115, 820 and 750 $cm^{-1}$; elemental analysis: calculated 66.8% C, 9.34% H, 11.13% N and 12.7% O; found: 66.8% C, 9.4% H, 11.1% N and 12.7% O.

2. Preparation of 11-[4-(p-nitrophenyl)-piperazin-1-yl]-undecyl methacrylate This methacrylate was prepared essentially as described in Example 2, Section 2, except that N-(11-hydroxyundecyl)-N'-(4-nitrophenyl)-piperazine was used instead of 2-[N-(p-nitrophenyl)-N-methylamino]-ethanol.

The elemental composition of the product, determined by chemical analysis, corresponded exactly to the theoretical calculations. It had the following $^1H$ nuclear magnetic resonance spectrum (400 MHz, $CDCl_3$, tetramethylsilane as internal standard): chemical shift $\delta$ (in ppm): 1.3–1.65 (multiplet, 18H), 1.95 (singlet, 3H), 2.6 (triplet, 4H), 3.45 (triplet, 4H), 4.15 (triplet, 2H), 5.5 (doublet, 2H), 6.1 (doublet, 2H), 6.8 (doublet, 2H) and 8.1 (doublet, 2H).

3. Preparation of the novel methacrylate copolymer 1 g of 11-[4-(p-nitrophenyl)-piperazin-1-yl]-undecyl methacrylate, 0.75 g of n-octadecyl methacrylate and 0.0176 g of azobisisobutyronitrile were dissolved in 25 ml of analytically pure toluene. The reaction solution was degassed by passing in nitrogen for one hour and then kept at 70° C. for 5 days in the absence of air, a further 0.0175 g of azobisisobutyronitrile being metered in daily. The reaction solution was then evaporated down, after which the methacrylate copolymer was precipitated by adding methanol. After repeated reprecipitation from tetrahydrofuran by methanol, 0.86 g of the novel methacrylate copolymer having a number average molecular weight $\overline{M}_n$ of 7,900 and a molar ratio (A):(B) of 1:1.03, determined by elemental analysis, was obtained. The spectroscopic properties of the novel methacrylate copolymer corresponded to the theoretical expectations.

The novel methacrylate copolymer was easy to process, transparent, homogeneous and laser-stable in the form of a thin film and very suitable for the production of Langmuir-Blodgett films.

EXAMPLE 4

Preparation of a novel methacrylate copolymer using a methacrylate (A) having a radical —CO—X—Y—Z according to the general formula I and n-octadecyl methacrylate (B)

Experimental method:

1. Preparation of 4'-[N-methyl-N-(11-hydroxyundecyl)-amino]-4-nitroazobenzene 12.5 g of 11-bromoundecan-1-ol in 40 ml of toluene were added dropwise to 5.1 g of N-methylaniline in 5.1 g of triethylamine and 20 ml of toluene at 85° C. while stirring. Stirring was continued for a further 5 hours at 85° C., after which the resulting precipitate was filtered off under suction. The filtrate separated was evaporated down and the residue was dried under reduced pressure from an oil pump. 9.5 g of crude N-methyl-N-(11-hydroxyundecyl)-aniline were further processed immediately in the following manner:

The diazonium salt was prepared at −10° C. from 5.3 g of 4-nitroaniline and sodium nitrite in 19 ml of concentrated hydrochloric acid and 4 ml of water. Excess sodium nitrite was destroyed with 1.9 g of urea. A suspension of N-methyl-N-(11-hydroxyundecyl)-aniline in 5.7 ml of concentrated hydrochloric acid and 28.5 ml of water was added dropwise at −10° C. The resulting reaction mixture was heated to room temperature after 45 minutes and brought to pH 4 with potassium acetate. The precipitate which separated out was filtered off under suction after standing for 30 minutes and then washed neutral with water. The resulting crude product was recrystallized from a mixture of heptane and ethanol in a volume ratio of 9:1, 9.1 g of 4'-[N-methyl-N-(11-hydroxyundecyl)-amino]-4-nitroazobenzene being obtained, which corresponded to a yield of 63% of theory.

2. Preparation of 4-nitro-4'-[N-methyl-N-(11-methacryloyloxyundec-1-yl)-amino]-azobenzene The 4'-[N-methyl-N-(11-hydroxyundecyl)-amino]-4-nitroazobenzene obtained in process step 1 was reacted with methacryloyl chloride according to the method stated in Example 2, Section 2, to give 4-nitro-4'-[N-methyl-N-(11-methacryloyloxyundec-1-yl)-amino]-azobenzene [methacrylate (A)]. The resulting product had the following physicochemical properties: IR spectrum (KBr pellet): bands at 2,900, 2,850, 1,705, 1,585, 1,490, 1,325, 1,120, 1,150, 1,095, 850 and 810 cm$^{-1}$; $^1$H nuclear magnetic resonance spectrum (400 MHz, CDCl$_3$, tetramethylsilane as internal standard, chemical shift δ (in ppm): 1.3 to 1.65 (multiplet, 18H), 1.9 (singlet, 3H), 3.1 (singlet, 3H), 3.4 (triplet, 2H), 4.3 (triplet, 2H), 5.6 (singlet, 1H), 6.1 (singlet, 1H), 6.7 (doublet, 2H), 7.9 (doublet, 4H), 8.3 (doublet, 2H); elemental analysis: calculated: 67.3% C, 8.03% H, 13.13% N, 11.25% 0; found: 66.1% C, 7.7% H, 13.8% N, 12.1% 0.

3. Preparation of the novel methacrylate copolymer 0.38 g of 4-nitro-4'-[N-methyl-N-(11-methacryloyloxyundec-1-yl)-amino]-azobenzene, 0.52 g of n-octadecyl methacrylate and 0.009 g of azobisisobutyronitrile were dissolved in 16 ml of analytically pure toluene. The resulting reaction solution was degassed by passing in nitrogen for one hour. It was then polymerized under a gentle stream of nitrogen in the course of 8 hours at 70° C. Thereafter, a further six portions of 0.009 g of azobisisobutyronitrile were metered in, the reaction mixture being kept at 70° C. for 8 hours after each addition. The reaction mixture was then filtered and the products present in the filtrate were precipitated with methanol and separated off. The novel methacrylate copolymer obtained was washed with a few drops of acetone and then reprecipitated twice from toluene with methanol 0.17 g of the purified novel methacrylate copolymer was obtained. This had a number average molecular weight of $\overline{M}_n$ 8,400 and a molar ratio (A):(B) of 1:2.78, determined by elemental analysis. The spectroscopic properties of the novel methacrylate copolymer corresponded to the theoretical expectations.

This novel methacrylate copolymer, too, was easy to process, transparent, homogeneous and laser-stable in the form of a thin film and very suitable for the production of Langmuir-Blodgett films.

EXAMPLE 5

Preparation of the novel methacrylate copolymer using a methacrylate (A) having a radical —CO—X—Y—Z according to the general formula I and n-octadecyl methacrylate (B)

Experimental method:

1. Preparation of N-methyl-N-(11-hydroxyundecyl)-amine

A mixture of 5.8 g of N-methylformamide, 13.6 g of sodium hydroxide solution powder [sic], 5.8 g of potassium carbonate powder, 3.2 g of tetrabutylammonium bisulfate and 90 ml of dimethylpropyleneurea was stirred for 1 hour at room temperature. Thereafter, the resulting mixture was heated at 40° C. for 20 minutes and then to 70° C. At this temperature, a solution of 25 g of 11-bromoundecan-1-ol in 70 ml of dimethylpropyleneurea was added dropwise to the mixture. The resulting reaction mixture was then stirred for a further 12 hours at 70° C. and then poured onto 1.6 l of water. The aqueous phase obtained was extracted with four times 180 ml of a solvent mixture of ether and ethyl acetate in a volume ratio of 1 1. The resulting organic phases were combined, and the combined organic phase was washed with three times 50 ml of water and then dried with sodium sulfate. After the sodium sulfate had been separated off and the organic solvent evaporated off, 20.5 g of N-methyl-N-(11-hydroxyundecyl)-formamide were obtained, which corresponded to a yield of 91%.

The total amount of bisalkylated formamide in 100 ml of methanol and 40 ml of concentrated hydrochloric acid was refluxed for 8 hours. After cooling, the reaction mixture was brought to pH 13 with 10% strength sodium hydroxide solution and then extracted with three times 80 ml of a solvent mixture of ether and ethyl acetate in a volume ratio of 1:1. The combined organic phases were then washed with three times 30 ml of water and then dried with sodium sulfate After the sodium sulfate had been separated off, the organic solution was evaporated down and the resulting N-methyl-N-(11-hydroxyundecyl)-amine was recrystallized from n-heptane. 11.3 g of a purified product were obtained In the form of a KBr pellet, this had the following IR spectrum: bands at 3,350, 3,300, 2,900, 2,850, 1,450, 1,360, 1,110 and 1,050 cm$^{-1}$:

2. Preparation of 4-[N-methyl-N-(11-hydroxyundecyl)-amino]-benzaldehyde 11.6 g of the N-methyl-N-(11-hydroxyundecyl)amine obtained according to Section 1, 8 g of potassium carbonate powder, 7.18 g of 4-fluorobenzaldehyde and 2 drops of the conventional and known phase transfer catalyst Aliquat ® 336 (fatty quaternary ammonium chloride) in 50 ml of dimethylpropyleneurea were stirred for 72 hours at 95° C. Aliquat 336 is a commercial product and constitutes methyl-trioctylammonium chloride. It is a mixture of $C_8$- and $C_{10}$-chains, $C_8$ being predominant. It is used as a phase transfer catalyst and liquid ion exchanger. The reaction mixture was then diluted with 700 ml of water and extracted with three times 50 ml of a solvent mixture of ether and ethyl acetate in a volume ratio of 1:1. The combined extracts were washed with three times 50 ml of water and then dried with sodium sulfate and, after the sodium sulfate had been separated off, were evaporated down. The resulting residue was freed from unconverted benzaldehyde by drying at 60° C. under reduced pressure from an oil pump, this procedure being monitored by thin layer chromatography. The dry product was purified by boiling with active carbon in acetone 12.45 g of 4-[N-methyl-N-(11-hydroxyundecyl)]-amino]-benzaldehyde were obtained, whose IR spectrum (KBr pellet) had bands at 3,400, 2,900, 2,850, 1,660, 1,580, 1,520, 1,460, 1,440, 1,380, 1,310, 1,240, 1,160, 1,050 and 820 $cm^{-1}$.

3. Preparation of 4'-[N-methyl-N-(11-hydroxyundecyl)-amino]-benzaldehyde-4-nitrophenylhydrazone A mixture of 8.62 g of 4-[N-methyl-N-(11-hydroxyundecyl)-amino]-benzaldehyde, 4.33 g of 4-nitrophenylhydrazine and 25 ml of glacial acetic acid were [sic] refluxed for 30 minutes and left to stand overnight at room temperature. 70 ml of ice water were added to the resulting reaction mixture and the mixture was stirred thoroughly After the water had been removed from the reaction mixture, the reaction product, which had now precipitated, was separated off and then subjected to preliminary purification by boiling with active carbon in acetone. The prepurified product was then purified by flash chromatography on silica gel, a mixture of hexane and ethyl acetate in a volume ratio of 6:4 being used as the mobile phase. A total of 3.4 g of 4'-N-methyl-N-(11-hydroxyundecyl)-amino]-benzaldehyde-4-nitrophenylhydrazone were obtained, corresponding to a yield of 28% of theory. In its IR spectrum, this product, in the form of a KBr pellet, had bands at 3,400, 3,250, 1,585, 1,510, 1,490, 1,460, 1,320, 1,290, 1,270, 1,170, 1,100, 830 and 810 $cm^{-1}$.

4. Preparation of 4'-[N-methyl-N-(11-methacryloyloxyundec-1-yl)-amino]-benzaldehyde-4-nitrophenylhydrazone 4.51 g of 4'-[N-methyl-N-(11-hydroxyundecyl)amino]-benzaldehyde-4-nitrophenylhydrazone in 40 ml of chloroform were initially taken. 1.14 g of triethylamine and 1.21 g of methacryloyl chloride, each in 10 ml of chloroform, were added dropwise to this solution. Hydroquinone monomethyl ether, as a stabilizer, was then added to the resulting reaction mixture, which was then refluxed for 7 hours. Thereafter, a further small amount of triethylamine and methacryloyl chloride were metered in so that a 10 mol % excess of these two reactants resulted. The reaction mixture was then refluxed for a further 6 hours. The reaction mixture was cooled to room temperature, after which 150 ml of water were added. The organic phase was separated off from the aqueous phase, washed with three times 40 ml of water, with three times 30 ml of 10% strength sodium bicarbonate solution and then again with 30 ml of water and dried with sodium sulfate. The sodium sulfate was separated off, after which the organic phase was evaporated down. If the IR the residue was again subjected to the reaction conditions described above.

After the solvent had been removed from the residue, the latter was purified by flash chromatography over silica gel using a solvent mixture of ethyl acetate and hexane in a volume ratio of 3:7 and then recrystallized from a solvent mixture of heptane and dioxane in a volume ratio of 95:5.

1.52 g of 4'-[N-methyl-N-(11-hydroxyundecyl)-amino]-benzaldehyde-4-nitrophenylhyirazone were obtained. The product had the following physical properties: IR spectrum (KBr pellet): bands at 3,260, 2,900, 2,850, 1,700, 1,590, 1,510, 1,495, 1,470, 1,320, 1,300, 1,275, 1,180, 1,110, 840 and 810 $cm^{-1}$; $^1H$ nuclear magnetic resonance spectrum (400 MHz, $CDCl_3$, tetramethylsilane as internal standard), chemical shift $\delta$ (in ppm): 1.3–1.6 (multiplet, 18 H), 1.9 (singlet, 3H), 3.0 (2H, unresolved), 3.36 (2H, unresolved), 4.1 (triplet, 2H), 5.5 (singlet, 1H), 6.1 (singlet, 1H), 6.6 (doublet, 2H), 7.1 (doublet, 2H), 7.5 (doublet, 2H), 7.7 (singlet, 1H), 8.15 (doublet, 2H).

The chemically determined elemental composition corresponded to the theoretical calculations: calculated: 68.5% C, 7.9% H, 11.0% N and 12.6% O; found: 67.9% C, 8.2% H, 10.2% N and 13.0% O.

5. Preparation of the novel methacrylate copolymer 0.4 g of 4'-[N-methyl-N-(11-methacryloyloxyundecl-yl)-amino] -benzaldehyde-4-nitrophenylhydrazone, 0.266 g of n-octadecyl methacrylate and 0.007 g of azobisisobutyronitrile were dissolved in 15 ml of analytically pure toluene. The resulting solution was degassed by passing in nitrogen and then stirred at 70° C. for 72 hours under nitrogen, a further nine portions of 0.007 g of azobisisobutyronitrile being metered in during this time. The course of the reaction was monitored with the aid of gel permeation chromatography. After the end of the polymerization, the solution was filtered and the filtrate was evaporated down to about 3 ml. The novel methacrylate copolymer was then precipitated in methanol and reprecipitated twice more from toluene with methanol. 0.38 g of the novel methacrylate copolymer was obtained. It had a number average molecular weight $M_n$ of 7,500.

The novel methacrylate copolymer was easy to process, transparent, homogeneous and laser-stable in the form of a thin film and very suitable for the production of Langmuir-Blodgett films.

EXAMPLES 6 TO 8

Production of novel Langmuir-Blodgett films by the Langmuir-Blodgett technology

The novel methacrylate copolymer of Example 2 was used for carrying out Examples 6 to 8.

EXAMPLE 6

Production of a novel Langmuir-Blodgett multilayer from the methacrylate copolymer Experimental method:

A solution having a concentration of 1 mg/ml of copolymer in pure chloroform was applied to the surface of a Langmuir trough. A solid monomolecular film was obtained by increasing the surface pressure by means of a movable barrier. At a surface pressure of 25 mN/m, the solid monomolecular film was transferred to the surface of a cleaned silicon chip by vertically dipping in said chip and withdrawing it. The rate of dipping was 4 mm/min, and the solid monomolecular film transferred in Y deposition with a transfer ratio of virtually 1.0.

This process was repeated several times so that a Langmuir-Blodgett multilayer resulted whose thickness, determined ellipsometrically in the conventional and known manner, increased linearly with the number of transferred monolayers.

EXAMPLE 7

Production of a novel Langmuir-Blodgett multilayer which contains Langmuir-Blodgett monolayers of the methacrylate copolymer and of a polymer amphiphile in alternating sequence Experimental method:
Example 6 was repeated, except that, after each application of a solid monomolecular film of the copolymer, a solid monomolecular film of the polymeric amphiphile

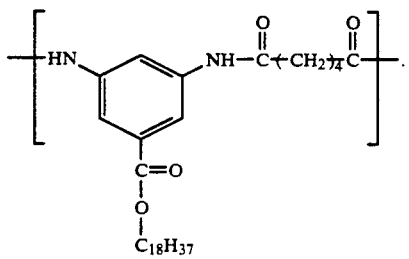

was transferred in Y deposition.

EXAMPLE 8

Production of a novel Langmuir-Blodgett monolayers which contains Langmuir-Blodgett monolayers of the methacrylate copolymer and of a low molecular weight amphiphile in alternating sequence Experimental method:
Example 7 was repeated, except that tricosenoic acid was used instead of the polymeric amphiphile.

The novel Langmuir-Blodgett multilayers produced according to Examples 6 to 8 were of excellent quality and had a uniform thickness and virtually no film defects. They were all extremely stable to intense laser radiation. Among the Langmuir-Blodgett multilayers produced, on the basis of their nonlinear optical properties that of Example 6 was suitable, that of Example 8 particularly suitable and that of Example 7 very particularly suitable as nonlinear optical materials for nonlinear optical arrangements. The novel Langmuir-Blodgett multilayers of Example 7 furthermore were mechanically extremely stable.

EXAMPLES 9 TO 14

Production of novel Langmuir-Blodgett films by the Langmuir-Blodgett technology

The novel methacrylate copolymer of Example 3 was used for carrying out Examples 9 and 10.

The novel methacrylate copolymer of Example 4 was used for carrying out Examples 11 and 12.

The novel methacrylate copolymer of Example 5 was used for carrying out Examples 13 and 14.

The novel Langmuir-Blodgett multilayers of Examples 9 to 14 were produced by the general experimental method stated in Example 6, except that the temperature of the Langmuir trough was 15° C. and that a surface pressure of 20 mN/m was used in Examples 9, 11 and 13, and a surface pressure of 22 mN/m in Examples 10, 12 and 14.

The thickness of the novel Langmuir-Blodgett multilayers, determined ellipsometrically in a conventional and known manner, increased linearly with the number of transferred monolayers.

The novel Langmuir-Blodgett multilayers produced according to Examples 9 to 14 were also of excellent quality and had a uniform thickness and virtually no film defects. They were all extremely stable to intense laser radiation and were therefore very suitable as nonlinear optical materials for nonlinear optical arrangements.

We claim:
1. A (meth)acrylate copolymer which contains, as polymerized units,
   A) one or more (meth)acrylates or (meth)acrylamides having second order nonlinear optical properties and the formula

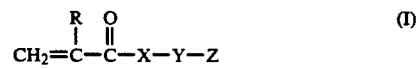

where R s hydrogen or methyl, X is a flexible spacer, which may or may not be present, Y is a divalent group having electron donor activity capable of donating electrons to the easily polarizable conjugated π-electron system of Z and Z is a noncentrosymmetic radical containing an easily polarizible conjugated π-electron system and one or more nitro, trifluoromethyl, cyano, or fulven-6-yl groups as electron acceptor groups capable of accepting electrons directly from -YZ, and
   B) one or more (meth) acrylates of alkanols where the alkyl radical is of 10 to 30 carbon atoms, the molar ratio of A to B being from 1:0.5 to 1:5.

2. A (meth)acrylate copolymer as claimed in claim 1, wherein the length of the alkyl ester radicals (—COO—alkyl) of the (meth)acrylates (B) is approximately the same length as the radicals —CO—X—Y—Z or —CO—Y—Z of the (meth)acrylates or (methacrylamides (A) of the formula I.

3. A (meth)acrylate copolymer as claimed i claim 1, which contains exclusively one or more (meth)acrylates or (meth)acrylamides (A) and one or more (meth)acrylates (B) as polymerized units.

4. A nonlinear optical material which comprises a (meth)acrylate copolymer as claimed in claim 1.

5. A Langmuir-Blodgett film in which the film-forming groups or molecules are all uniformly spatially oriented and which comprises one or more solid monomolecular Langmuir-Blodgett films comprising the (meth)acrylate copolymer as claimed in claim 1.

6. A nonlinear optical arrangement which contains one or more substrates and one or more Langmuir-Blodgett films as claimed in claim 5.

7. A nonlinear optical arrangement which has at least one substrate and at least one film comprising the (meth)acrylate copolymer as claimed in claim 1.

8. A process for the uniform spatial orientation of organic radicals, wherein first
   (1) a (meth)acrylate copolymer as claimed in claim 1 is prepared and said copolymer is then
   (2) formed into at least one solid monomolecular Langmuir-Blodgett film.

* * * * *